Sept. 4, 1934.   M. A. LISSMAN   1,972,528
APPARATUS FOR PRODUCING UNIDIRECTIONAL ELECTRIC CURRENT AT HIGH VOLTAGE
Filed Jan. 13, 1932   4 Sheets-Sheet 1

INVENTOR.
MARCEL A. LISSMAN
BY
ATTORNEYS.

Sept. 4, 1934.   M. A. LISSMAN   1,972,528
APPARATUS FOR PRODUCING UNIDIRECTIONAL ELECTRIC CURRENT AT HIGH VOLTAGE
Filed Jan. 13, 1932   4 Sheets-Sheet 2
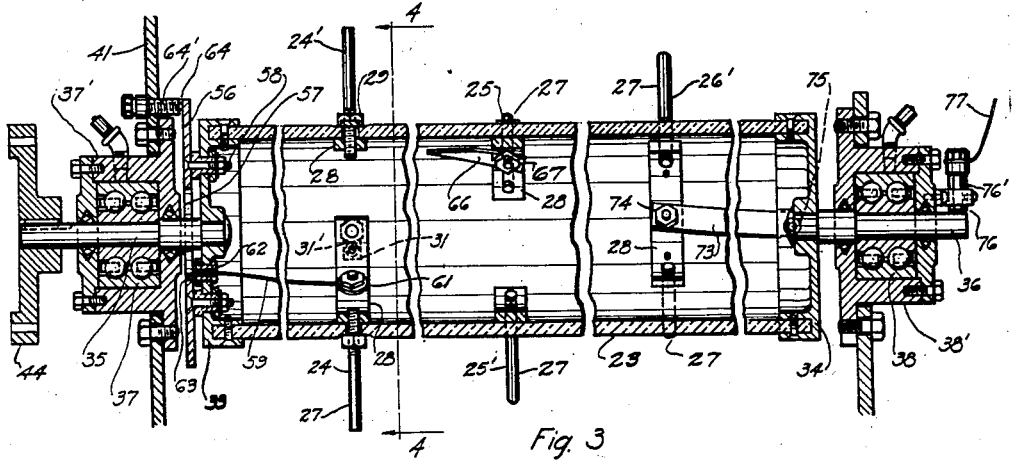
INVENTOR.
MARCEL A. LISSMAN
BY
ATTORNEYS.

Sept. 4, 1934.    M. A. LISSMAN    1,972,528
APPARATUS FOR PRODUCING UNIDIRECTIONAL ELECTRIC CURRENT AT HIGH VOLTAGE
Filed Jan. 13, 1932    4 Sheets-Sheet 3
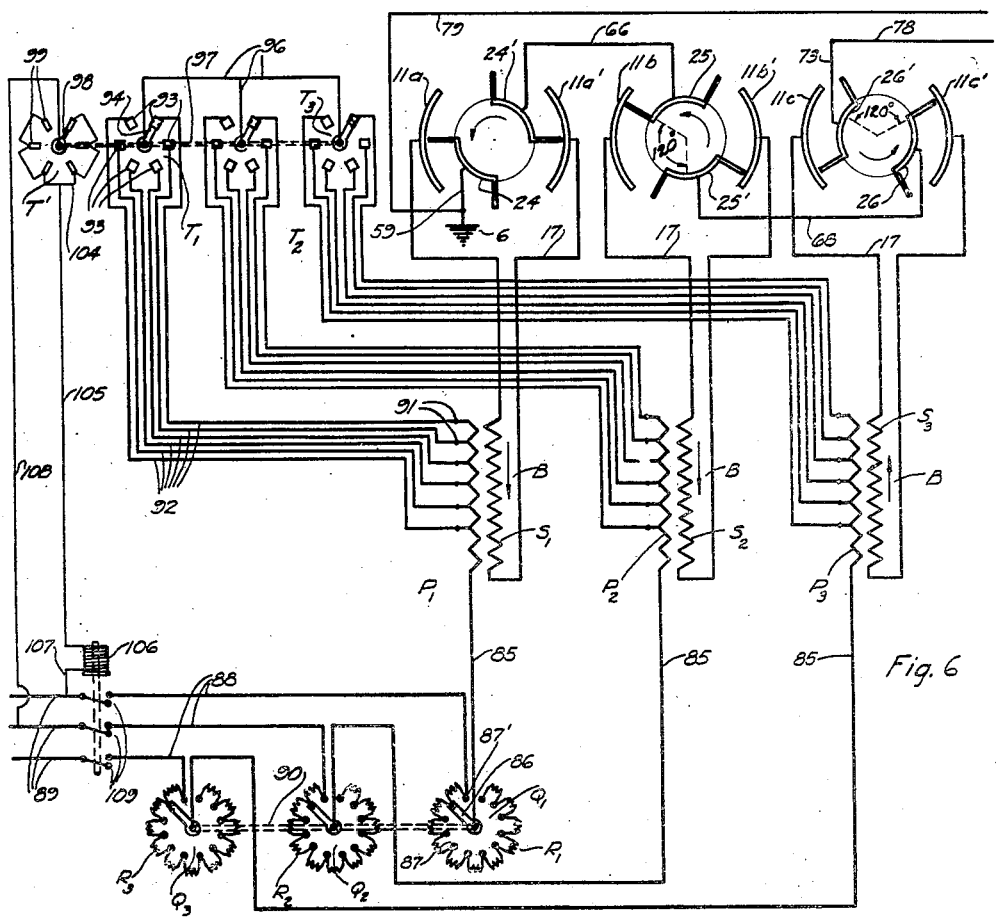
Fig. 6
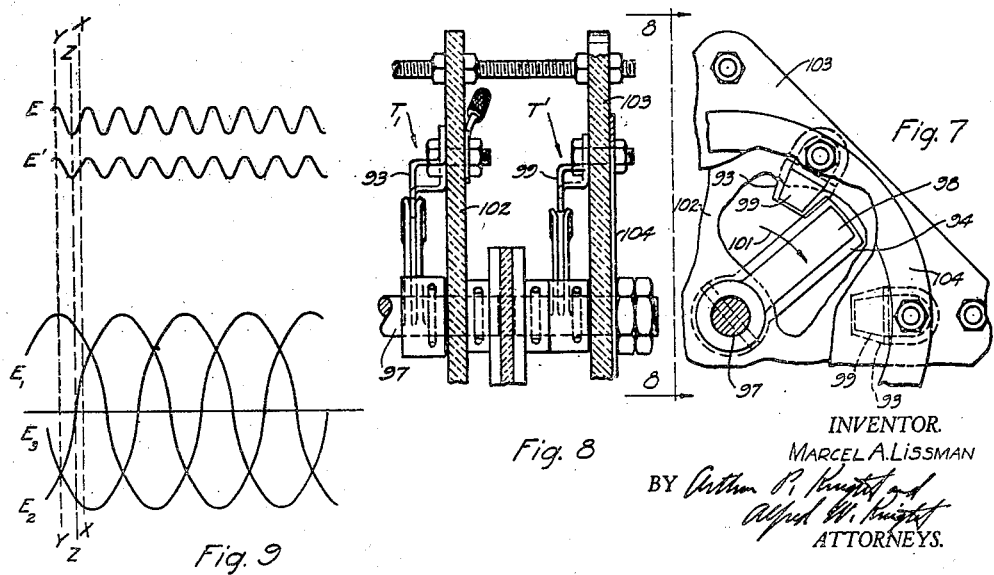
Fig. 7
Fig. 8
Fig. 9
INVENTOR.
MARCEL A. LISSMAN
BY
ATTORNEYS.

INVENTOR.
MARCEL A. LISSMAN
BY
ATTORNEYS.

Patented Sept. 4, 1934

1,972,528

UNITED STATES PATENT OFFICE 1,972,528

APPARATUS FOR PRODUCING UNIDIRECTIONAL ELECTRIC CURRENT AT HIGH VOLTAGE

Marcel A. Lissman, Alhambra, Calif., assignor to International Precipitation Company, Los Angeles, Calif., a corporation of California Application January 13, 1932, Serial No. 586,453

11 Claims. (Cl. 175—364)

This invention relates to apparatus for producing unidirectional electric current, and particularly for converting polyphase alternating current at relatively low voltage to unidirectional current at relatively high voltage. The invention is particularly intended for production of unidirectional current at high voltage for use in electrical precipitation apparatus, but may also be used for other apparatus where current of this type is desired.

An important object of this invention is to obtain unidirectional current of maximum voltage in an apparatus of a given size and cost, and particularly to obtain maximum efficiency of utilization of the voltages induced in the several phases of a polyphase transformer which is utilized to increase the voltage to the desired value.

More specifically, an object of this invention is to utilize continuously the voltages in all of the phases, so that the output voltage at any instant is substantially equal to the arithmetical sum of the instantaneous voltages in the several phases.

A further object is to obtain the smoothest possible voltage curve in the output circuit, not only by providing for relatively little variation between maximum and minimum output voltage (or between either of these values and the effective or "root mean square" value of the voltage) but also by minimizing the production of transient voltages such as ordinarily occur at the times of making and breaking connections at the commutating means of the mechanical rectifiers heretofore employed.

A further object of the invention is to provide a compact apparatus in which the transformer and the rectifying or commutating mechanism are contained within a common housing and in which the electrical connections and the insulation problems are simplified to the utmost degree.

Other objects and advantages of the invention will be hereinafter pointed out or will be apparent from the following description of the apparatus and of the operation thereof.

In the apparatus of this invention the commutating means includes fixed contact means connected to the respective secondary windings of a polyphase transformer, and a rotary commutator driven in synchronism with the frequency of the current supplied to said transformer and provided with contact means rotatable therewith and controlling connection between said fixed contact means in such manner as to connect all of the phases of said transformer in series at all times, with the induced voltages in all of said phases acting in the same direction in the circuit, the commutation of each phase being effected approximately at the instant when the induced voltage in that phase is passing through zero in reversing from one direction to the other. For each phase of the system, there are preferably provided two fixed contact members connected to the opposite terminals of the transformer secondary winding of that phase, and two rotatable contact members adapted to each make spark connection with the respective fixed contact members during alternate half-cycles and throughout approximately 180° each, and the rotatable contact members for the several phases are mounted in such relative angular positions and are so interconnected to those of the adjacent phases as to cause the instantaneous voltages in all the phases to be at all times added together so that a total voltage is obtained which is equal to the sum of the instantaneous phase voltages. The fixed and rotating contact members for adjacent phases are preferably disposed in separate planes perpendicular to the axis of the rotary commutator and spaced apart axially thereof, and electrical connections are provided between the rotatable contacts of the adjacent phases, suitable electrical connections being brought out from one of the rotatable contact members at each end of the series, for connection to an output circuit. Furthermore, all of the rotatable contact members are preferably mounted upon a common rotatably mounted insulating member which may advantageously be formed as a hollow cylinder rotatable about its axis.

In the preferred embodiment of this invention a grounded unitary housing is provided for the apparatus, divided by intermediate partition means into a lower casing portion in which the polyphase transformer is mounted and an upper casing portion in which the commutating mechanism and the driving means therefor are mounted. Said intermediate partition may constitute the top or cover of the transformer casing, and the rectifying and commutating mechanism preferably mounted directly thereon. The lower casing portion in which the transformer is mounted is preferably sufficiently air tight in order to permit the maintaining of a body of oil or other suitable dielectric medium around and between the transformer windings, while the upper casing portion may be provided with openings permitting circulation of air therethrough around the commutating mechanism, and means are preferably provided for mechanically assisting or promoting such circulation of air. The high voltage leads from the transformer windings to the fixed contacts of the commutating mechanism preferably extend through the intermediate partition or transformer casing cover, said leads being insulated from said cover in any suitable manner, for example, by being provided with insulating sleeves or bushings where they extend through said cover. The commutator mechanism is provided at one end with means for maintaining the contact member connected to the transformer winding at one end of the series in electrical connection with the grounded or low potential end of the output circuit, and at the other end with means for maintaining the contact member connected to the transformer winding at the other end of the series in electrical connection with a single electrical conductor constituting the high potential end of the output circuit. This last-mentioned conductor is the only high tension lead which needs to be brought out through the wall of the housing and the insulating bushing through which this conductor extends through the wall is, therefore, the only high tension insulating bushing required through the outside wall of the casing.

The commutating means is preferably made in the form of a cylindrical rotor member of insulating material rotated at synchronous speed, with the contact members for controlling connection of the respective transformer windings in the circuit all spaced axially of said tubular member, so as to provide the necessary electrical clearance therebetween. These contact members preferably project outwardly from the cylindrical rotor, while the necessary electrical connections therebetween are preferably made by means of conducting members extending within said rotor, thus materially reducing windage losses during rotation of the commutator. The diameter of the rotor is sufficient to provide the necessary electrical clearance between electrical conductors and contacts disposed in any particular transverse plane. Each rotatable contact member may be formed as a single projecting element having a continuous circumferentially elongated surface or edge extending throughout the desired angular length of said member, but in order to decrease the weight and simplify the construction and adjustment of parts, it is preferred to form each contact member of two projecting pins of relatively small diameter disposed at the opposite ends of the angular position occupied by said member and connected together by an arc-shaped band preferably disposed inside the insulating rotor.

In view of the relatively high speed of rotation of the rotary commutating means, and the high voltages involved, it is not desirable that the contact means thereof shall actually pass in direct engagement with the fixed contact means, but only in sufficient close proximity thereto to permit completion of the electric circuit through a spark or arc across a short air gap therebetween, and any reference herein, or in the appended claims, to the making of contact between such contact means, or the duration of such contact, will be understood to comprehend completion of the electric circuit in this manner.

The apparatus may also include variable resistance means connected in series with the respective transformer primary windings. Furthermore, each of said primary windings may be provided with a plurality of taps, and suitable voltage-regulating switch means may be provided for making connection to any one of said taps, said switches for all the phases being preferably operatively connected so as to obtain simultaneous adjustment of the turn ratios for all phases. The transformer primary windings may be connected to a polyphase power supply system in either star or delta arrangement.

The accompanying drawings illustrate apparatus in accordance with this invention and referring thereto:

Fig. 3 is a longitudinal section of the rotating commutator on line 3—3 in Fig. 2.

Fig. 4 is a transverse section on line 4—4 in Fig. 3, also showing a pair of fixed contact members.

Fig. 4a is a semi-diagrammatic transverse section of a set of fixed and rotating contact members, illustrating the commutating action thereof.

Fig. 5 is an isometric projection of the contact means and electrical connections mounted on the rotating commutator member, with the tubular insulating member on which these parts are mounted indicated in broken lines.

Fig. 6 is a wiring diagram of the entire apparatus.

Fig. 7 is an enlarged end elevation of a part of the voltage-regulating switch means, on line 7—7 in Fig. 1.

Fig. 8 is a section on line 8—8 in Fig. 7.

Fig. 9 is a diagram representing the relation between the induced secondary voltages in the several phases and the output voltage.

Figures 1, 2:
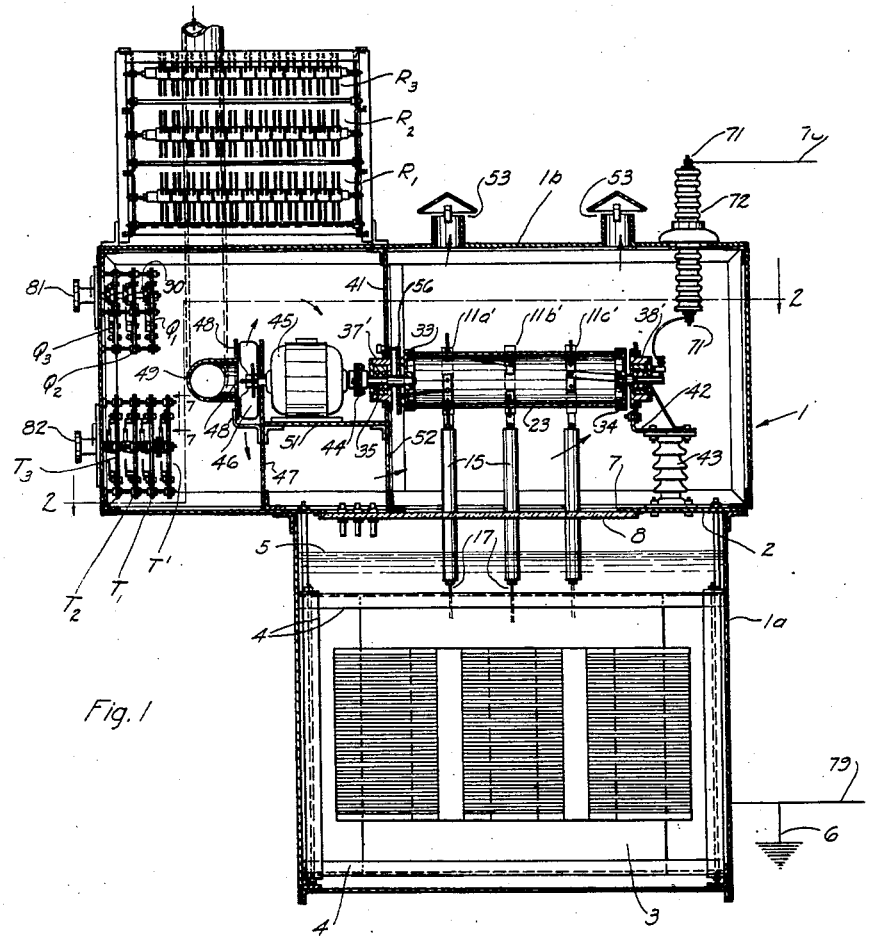
Fig. 1 is a longitudinal vertical section of an apparatus adapted to convert three-phase low voltage alternating current into high voltage unidirectional current.
Fig. 2 is a horizontal section on line 2—2 in Fig. 1.

The apparatus shown in Figs. 1 to 8 inclusive, comprises a housing 1 whose interior is divided by an intermediate partition 2 into a lower casing portion 1a for the transformer and an upper casing portion 1b for the commutating mechanism. A three-phase iron core transformer 3 consisting, for example, of an iron core having three branches on which the primary and secondary windings of the respective phases are wound, is mounted within the casing portion 1a, being supported for example by suitable frame members 4. In Fig. 1 no attempt is made to illustrate the relative positions of the primary and secondary windings of the respective phases, since this may conform to standard construction of three-phase transformers, and the electrical connections of these windings in the circuit are clearly shown in Fig. 6. The transformer is preferably immersed in a suitable oil, as indicated at 5.

The walls of the housing 1 may be of metal and are preferably grounded electrically as indicated at 6. The partition 2 may also be of metal, but I have shown the same as provided with an opening 7, with a plate 8 of insulating material secured to said partition in any suitable manner and extending across said opening and tightly closing the same, the construction being such that the lower casing portion 1a is substantially air tight.

The fixed contact means of the commutating mechanism are shown as comprising three pairs of fixed arcuate contact shoes 11a, 11a', 11b, 11b', 11c and 11c', corresponding respectively to the three phases of the transformer. Each of said contact shoes preferably extends through an arc of approximately 90° and the two shoes of each pair are positioned substantially diametrically opposite one another so that a space of approximately 90° is provided between the adjacent ends thereof, as shown in Fig. 4. The fixed contact shoes are shown as disposed in the same angular positions in all three sets thereof, namely,—in positions symmetrically disposed with respect to a horizontal plane passing through the axis of curvature thereof. The contact shoes of each pair are mounted substantially in a common plane extending perpendicular to the axis of curvature of said shoes, and the respective pairs are spaced apart longitudinally of said axis by a distance sufficient to provide the necessary electric clearance therebetween. Said contact shoes may be supported in any suitable manner but are shown as mounted on electrically conducting supporting standards 12, by means of threaded pins 13 rigidly secured to said shoes and nuts. The supporting standards 12 are shown as mounted on the upper ends of insulating bushings 15 carried by insulating plate 8. An electrical conductor 17 is connected to each of the contact shoes, for example, through the corresponding standard 12, as shown, and extends through the corresponding insulating bushing 15 down into the lower casing section 1a, where the respective conductors are connected to the terminals of the secondary windings of the respective phases of the transformer. In view of the fact that the plate 8 itself is of insulating material, it is evident that the insulating bushings 15 may be of relatively small size since they are not required in themselves to insulate the conductors extending therethrough against the total potential difference between any two of said conductors or between said conductors and the housing. However, if insulating bushings of sufficient size and insulating power are used, the insulating plate 8 may be eliminated, and the metal partition 2 may extend entirely across the housing.

The rotating commutator is shown as comprising a tubular rotor 23 formed of suitable insulating material, said rotor being rotatably mounted about its axis, which corresponds with the axis of curvature of the contact shoes above described, and three pairs of rotatable contact members disposed in the transverse planes of the respective pairs of fixed contact shoes and mounted on said tubular rotor. In the form of commutator shown, each pair of rotating contact members comprises two diametrically opposed contact members, indicated at 24, 24', 25, 25', 26 and 26', and each such contact member consists of two radially projecting pins 27 mounted a suitable angular distance apart, for example, approximately 90°, and electrically connected together by conducting metal bands 28, so that the two pins of any one pair constitute in effect a single contact member adapted to maintain spark contact with each corresponding fixed shoe, such as 11a, during rotation of the rotor 23 through substantially 180°, that is, from the position at which the first pin of said pair comes into position opposite the nearer end of said contact shoe until the position at which the other pin of said pair passes beyond the further end of said shoe. The bands 28 which connect the two pins of each contact member are arc-shaped and are preferably disposed just inside the rotor 23 and in contact with the inner face thereof, as shown. The pins 27 are threaded at their inner ends and screw into the connecting bands 28, and are held in position of proper radial adjustment by means of lock nuts 29. Said lock nuts may, in turn, be locked against turning by means of locking clips 31 having V-shaped notches 31' at their ends engaging said nuts, said clips being releasably secured in locking position by screws 32. The pins 27 are normally adjusted so that the outer ends thereof are spaced a short distance inwardly from the fixed contact shoes, as hereinafter described.

The direction of rotation of rotor 23 is indicated by the arrows at A in Figs. 4, 4a, and 6, and the contact members of each pair are set at a position 120° rearwardly of those in the preceding pair, with respect to this direction of rotation, as clearly indicated in Fig. 6. Thus, contact member 25 is 120° behind contact member 24, and so forth. It will be obvious that, instead of mounting the fixed contact shoes in the same angular positions in all three sets, and shifting the angular position of the rotating contact members in the successive sets, the same result may be obtained by mounting the rotating contact members in the same angular positions in all three sets, and shifting the angular position of the fixed contact members, but the latter construction is less practicable. In any event, the relative angular position of the rotating contact members of each set, with respect to the angular position of the corresponding fixed contact members, is displaced 120° rearwardly in the contact members corresponding to the successive phases of the system.

The insulating tubular rotor 23 is secured at its ends to flanged metal end members 33 and 34 to which are secured shafts 35 and 36 which extend outwardly from said end members and axially of said tubular rotor and are rotatably journaled in ball bearings 37 and 38 mounted upon bearing members 37' and 38'. Bearing member 37' is shown as supported upon a vertical partition plate 41 which extends across the upper casing section 1b, while the bearing member 38' is mounted on a supporting bracket 42 which is in turn mounted on an insulating support 43 secured to partition plate 2.

Shaft 35 is secured by coupling means 44 to the shaft of a synchronous motor 45, which is energized by connection to the same electric power supply system to which the transformer is connected, so that the rotor 23 will be rotated in exact synchronism with the current to be rectified. A centrifugal fan 46 may be mounted on the other end of said motor shaft. Said centrifugal fan is disposed between parallel vertical plates 47 and 48, said plate 48 being provided with an inlet opening 48' opposite the central portion of said fan, and the space between said plates being open at the periphery of the fan. An inlet conduit 49 is connected to inlet opening 48' and extends out through the wall of the casing means, and said conduit may open to the atmosphere or may be connected to any suitable source of clean air or other gas. Motor 45 is shown as mounted on a supporting plate 51 and is preferably disposed, as shown, at the opposite side of vertical partition 41 from the commutator mechanism above described. Partition 41 may be provided with an opening 52, preferably near the bottom thereof, for circulation of air or other gas, and the portion of the upper casing section in which the commutator mechanism is mounted may be provided with suitable vents 53, preferably in the top wall thereof, for discharge of air or other gas from the interior thereof.

The rotating contact member 24, disposed near one end of the rotor 23, is shown as electrically connected to a contact disc 56 which is provided with a central opening 57 and mounted on end member 33 by means of insulated bolts 58, said electrical connection being made, for example, by means of a wire 59 connected as at 61 to the connecting band 28 of said contact member 24 and passing through an insulating bushing 62 in the end member 33 and soldered or otherwise secured to the contact disc 56 as at 63. Contact disc 56 may be electrically grounded through the grounded metallic housing by suitable brush means, such as a spring pressed carbon brush 64 mounted in a suitable insulating holder 64' on vertical partition plate 41.

Contact member 24' is connected to contact member 25 by means of a metal connecting strip 66 extending inside the tubular rotor and connected at its ends to the connecting bands 28 of the respective contact members, as shown at 67, and contact member 25' is connected to contact member 26 by means of a similar connecting strip 68 connected to the corresponding bands 28 as shown at 69.

A high tension conductor 71 extends through an insulating bushing 72 mounted on the top wall of the upper casing portion 1b and extending therethrough, and suitable means are provided for maintaining electrical connection between said high tension conductor and the contact member 26', which is disposed adjacent the opposite end of the rotor from contact 24. Said connection may be established, for example, in substantially the same manner as the connection of the contact member 24 to the grounded partition plate 41, but I have shown a somewhat different form of connecting means comprising a metal strip 73 connected at one end to the connecting band 28 of said contact member 26', as at 74, and at the other end to the end member 34 as shown at 75, and a spring pressed carbon brush 76 mounted in a suitable insulating holder 76' on bearing member 28' and bearing against the periphery of the end portion of shaft 36, said carbon brush being connected by wire 77 to said high tension conductor 71. It will also be understood that any other suitable form of connecting means may be used for making the electrical connections between the output circuit and the contact members at the respective ends of the rotary commutator.

A high tension line 78 may be connected to conductor 71, leading to one side of a work circuit, for example, to the high tension electrode system of an electrical precipitator, while a low tension line 79 may be connected to the ground brush 64, or to any suitable part of the grounded metallic structure as indicated in Fig. 1, said low tension line leading to the other side of said work circuit, for example, to the low tension electrode system of an electrical precipitator.

The apparatus also preferably comprises resistance means $R_1$, $R_2$, and $R_3$, corresponding to the respective phases and electrically connected through suitable switch means $Q_1$, $Q_2$, and $Q_3$ to the primary transformer windings of the respective phases, as hereinafter described. Switching means $T_1$, $T_2$, and $T_3$, are also preferably provided for controlling connection to a plurality of taps on the respective primary windings as hereinafter described. The resistance means $R_1$, $R_2$, and $R_3$, may advantageously be mounted on top of the upper casing section 1b as shown, while the switch means $Q_1$ etc. and $T_1$ etc. may be mounted inside the same compartment of said upper casing section as the motor, and may be provided with operating handles 81 and 82 extending through the front wall of said casing section.

Referring now to the wiring diagram in Fig. 6, the three primary transformer windings are indicated at $P_1$, $P_2$, and $P_3$, and the three secondary windings at $S_1$, $S_2$, and $S_3$. Each primary winding is connected by a wire 85 to one terminal of the corresponding variable resistance switching means $Q_1$ etc. Each of said variable resistance switching means may comprise a rotatably mounted contact arm 86, to which the wire 85 may be connected, and a plurality of contact members 87 disposed about the axis of rotation of said contact arm and electrically connected to suitable taps on the corresponding resistance unit $R_1$ etc. The other terminal of each variable resistance switch, namely, the contact member connected to one end of the corresponding resistance unit, such as indicated at 87', may be connected by wire 88 to the corresponding phase conductor 89 of a suitable three-phase power input system at any ordinary commercial voltage. The contact arms 86 of the three switches $Q_1$, $Q_2$ and $Q_3$ may all be mounted upon a common shaft, indicated at 90 in Fig. 1, and also shown diagrammatically in Fig. 6, said shaft being operable by means of operating handle 81 above mentioned.

Each transformer primary winding, such as $P_1$, is provided with a plurality of taps 91 so disposed that a different number of turns of said primary winding is included between each of said taps and the terminal to which the conductor 85 is connected. Said taps are connected by conductors 92 to the respective contact members 93 of the corresponding voltage-regulating switch $T_1$ etc. Each of said switches also comprises a rotatably mounted contact arm 94 adapted to be brought into engagement with any one of the contact members 93 upon rotation of said arm, and the contact arms 94 of the three switches $T_1$, $T_2$ and $T_3$ are all electrically interconnected by means of conductors 96. All of said contact arms are also preferably mounted upon a common shaft 97 upon which is mounted the operating handle 82 above mentioned, so as to provide for simultaneous adjustment of the voltage in all phases. The connections above-described are such as to provide a star or Y-wound primary system, but it will be understood that, if desired, such connections may be modified so as to provide a delta-connected system.

I also prefer to provide means associated with the switches $T_1$, $T_2$ and $T_3$ for automatically causing the circuit to be broken at a point other than the contact members of said switches, upon movement of the contact arms toward a position to disengage the same from any one of the contact members 93, and causing said circuit to be held open at said other point until after said contact arms are brought into engagement with another of said contact members 93, and thereafter closing the circuit at said other point. Such automatic circuit opening and closing means may comprise an additional switch T' mounted adjacent switches $T_1$ etc., and having a contact arm 98 operatively associated with the contact arms 94, said contact arm 98, for example, being also mounted on the common shaft 97. Said switch T' also comprises a plurality of contact members 99 disposed at angular positions corresponding to the respective contact members 93, and the contact arm 98 or contact members 99, or both, are somewhat narrower than the contact arms 94 or contact members 93, or both, as shown particularly in Figs. 7 and 8, so that upon rotation of shaft 97 toward a position of disengagement of contact arms 94 with any set of contact members 93, for example, in the direction indicated by the arrow at 101 in Fig. 7, the contact arm 98 will be disengaged from the corresponding contact member 99 somewhat in advance of the disengagement of contact arms 94 from the corresponding contact members 93. In Figs. 7 and 8, the contact members 93 of each switch $T_1$ etc., are shown as mounted on an insulating supporting plate 102, and the contact members 99 of switch T' are also shown as mounted on an insulating supporting plate 103, said insulating plates being partly broken away in Fig. 7, in order to better illustrate the relation between the contact arms as above described. All of the contact members 99 are electrically interconnected, as by means of a conducting strip 104. Said conducting strip 104 is connected by wire 105 to one end of the winding of a relay magnet 106, the other end of said magnet winding being connected by wire 107 to one of the input phases 89. Another of said input phases is connected by wire 108 to contact arm 98 of switch $T_1$, so that when said contact arm 98 is in engagement with any one of the contact members 99, relay magnet 106 is energized, and the switch means 109 controlled thereby are held in closed position. However, when said contact arm 98 is moved out of such engagement, for example, as shown in Fig. 7, relay magnet 106 is de-energized and switch means 109 are caused to open by gravity or by suitable spring means, in the usual manner of such devices, thus breaking the electric circuit at the switch means 109 before the contact arms 94 are moved out of engagement with the corresponding contact members 93. It will also be seen that, as the shaft 97 is rotated further, toward a position of engagement of the contact arms 94 with the next set of contact members 93, the circuit will remain open at switch means 109 until after said contact arms have been brought into such engagement, and until contact arm 98 engages the next contact member 99, at which time the relay magnet 106 will again be energized and close the switch means 109. By means of the above arrangement, therefore, the electric circuit is neither opened nor closed at the contact means of the switches $T_1$ etc., so that said contact means are not subjected to the burning or pitting due to arcing therebetween, such as would occur if the circuit were to be opened or closed at said contact means.

The contacts and connections of the rectifier are shown diagrammatically in Fig. 6. The connecting wire 59 is shown as directly connected to the ground connection 6 and to the low tension line 79, and connecting strip 73 is shown as directly connected to the high tension line 78, but it will be understood that these connections are actually made as above described.

In the operation of the above-described apparatus, the synchronous motor 45 is rotated at a speed corresponding to the frequency of the electric current supplied to the transformer, so as to produce one revolution of the commutator rotor 23 during each cycle of said current. The resistance switches $Q_1$ etc. and the voltage-regulating switches $T_1$ etc., may be set at any suitable position, for example, as shown in Fig. 6, and the main line switch may then be closed. The rotating contact members 24 to 26' and the connections therebetween serve, in conjunction with the fixed contact members $11a$ to $11c'$, to electrically connect the transformer secondary windings of all three phases in series with one another at all times, between the grounded low tension conductor 79 and the high tension conductor 78, and to reverse the direction of connection of each transformer phase at substantially the time of reversal of the direction of induced voltage in that phase, so as to cause the induced voltages in all phases to act in the same direction in the circuit and to maintain between said low tension and said high tension conductors a voltage which is at all times substantially the sum of the instantaneous voltages in the several phases.

In Fig. 9 the curves $E_1$, $E_2$ and $E_3$ are the curves of voltage induced in the respective secondary windings of the transformer, the voltages being plotted as ordinates and times as abscissae in the usual manner. When the rotating contact members are in the positions shown in Fig. 6, the time value is represented by the vertical line X—X in Fig. 9. As will be seen, the direction of induced voltages in phases 1 and 2 is the same, while the voltage in phase 3 is in the opposite direction, as shown by the arrows at B in Fig. 6, while the magnitudes of the respective voltages are the intercepts of the respective voltage curves on the line X—X. Since the position of the rotary contact members at this time is such that the secondary winding of phase 3 is connected in the circuit in the reverse direction from phases 1 and 2, it is evident the result will be the maintenance of a potential difference between the output conductors 78 and 79 equal to the arithmetic sum of the phase voltages.

The curve E in Fig. 9 represents the total theoretical or no-load output voltage. It may be shown by calculation that, at any time such as indicated by the vertical line Y—Y in Fig. 9, when the voltage in any phase is at a maximum value $E_m$, the total voltage $E=2E_m$, and that at any time such as indicated by the vertical line Z—Z, when the voltage in any phase is zero, the total voltage $E=1.733E_m$. The frequency of the output voltage is, therefore, six times the frequency of the input voltage and the fluctuation from maximum to minimum is relatively small. The average theoretical value is $1.867\ E_m$, and the fluctuation between maximum and minimum is $0.267\ E_m$ or 14.3% of the average voltage.

It will be understood that the above calculations apply only to the no-load voltage between the output terminals or conductors 78 and 79 and that when said conductors are connected to a load, such as an electrical precipitator, the actual voltage between these terminals will be somewhat less than the value calculated above, due to the internal resistance of the transformer, the rectifier, and the associated circuits. The actual output voltage under such conditions, however, may be represented by a curve such as E' somewhat below the curve E but possessing similar characteristics as to frequency, percentage fluctuations, and complete utilization of the voltage in all the phases.

A particular advantage of the above apparatus is that commutation difficulties are minimized due to the short air gap provided between the tips of the rotatable contact pins and the fixed contact shoes, this air gap being indicated at 110 in Figs. 4 and 4a. The provision of this air gap controls absolutely the maximum transient voltage obtainable at the time of shifting connection of the respective rotatable contact members for each phase from one of the fixed contact members for that phase to the other fixed contact member, because the initial spark length at each of these times cannot be greater than the minimum spark length which is determined by the length of this air gap, and is consequently independent of the load. Referring particularly to Fig. 4a, it may be seen that as the contact pins, such as 24b and 24b' pass beyond the tips of the respective fixed contact segments, such as 11a and 11a', the other contact pins 24a' and 24a come into position opposite the forward ends of said fixed contact segments. At this time, however, a spark remains established between contact 24b and contact 11a, and between contact 24b' and contact 11a', and as the rotating contacts pass to the positions indicated in dotted lines, electrical connection will be maintained across the gaps indicated at 111 and 111', in spite of the relative elongation of said gaps, due to the fact that said gaps are ionized and consequently have a relatively low resistance as compared to the smaller gaps indicated at 112 and 112'. However, when the rotating contacts reach some such position as indicated in dotted lines, the voltage drop across the ionized paths 111 and 111' becomes sufficient to break down one of the non-ionized minimum gap lengths, such as at 112, and the current flow, for a short interval of time, probably divides, part continuing to flow through the corresponding transformer phase and part directly through that fixed contact, such as 11a', which is momentarily in spark connection with both rotating contacts 24a and 24b'. As the resistance of the arcs at 111' continues to increase, a spark is also formed at 112', and the direction of connection of that transformer phase in the circuit is reversed. When this commutation takes place the sparks previously drawn out at 111 and 111' immediately disappear, and the air at these regions quickly recovers its dielectric strength, particularly by reason of the high windage produced mechanically by rotation of the commutator and rotating contact members. It will be observed, therefore, that short circuiting between the terminals of any transformer phase is prevented, and also that the transient voltage produced at the time of commutation can not be greater than the voltage required to break down the minimum arc gap such as 112 and 112'. It appears desirable to set the commutator rotor at such position with respect to the driving motor shaft, that the rotating contact members are at some position between the full line positions and dotted line positions in Fig. 4a, when the induced voltage in the corresponding transformer phase is zero, because in this manner the resistance of the gap at 111 and 111' increases much more rapidly than the induced voltage of the transformer phase, thus preventing a short circuit.

Figure 10:
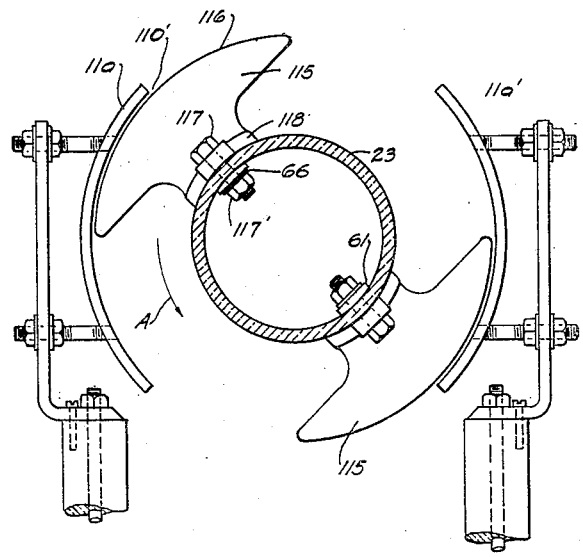
Fig. 10 is a transverse sectional view of the commutator, similar to Fig. 4, but showing a modified form of rotatable contact members.

Fig. 10 shows a modified construction of the rotatable contact members, which may be used instead of that above described. In this case each of said fixed contact members comprises an arcuate shoe 115 having a circumferential edge 116 extending through approximately 90° and of somewhat less diameter than the inner face of the fixed contact members, such as 11a and 11a', which may be constructed and mounted substantially the same as above described. A short air gap is thus provided as before between the fixed and rotating contact members, as indicated at 110'. Said contact members 115 may be secured to the rotor 23 in any suitable manner, as for example by means of bolts 117 and nuts 117', said bolts extending through lugs 118 and through said rotor. The connecting members 61 and 66, for connecting said contact members in the rectifier circuit may be disposed inside the rotor 23, in the same manner as above described.

The operation of a commutator provided with this form of contact means is substantially the same as above described, the forward end of each rotating contact member coming into position opposite the next fixed contact at approximately the time when the rearward end thereof passes beyond the tip of the preceding fixed contact member, and an arc being drawn out between said rearward end and said preceding fixed contact member until the resistance across the ionized path at this point becomes sufficient to form a new arc across the spark gap of minimum length between said forward end and the next fixed contact member.

The use of a hollow cylindrical rotor of insulating material, for supporting and effecting rotation of either of the above-described forms of rotating contact member, minimizes the diameter of the rotor required to maintain proper electrical clearance between the opposite contact members of each pair, due to the fact that said contact members are separated diametrically by the air inside the cylinder, and the only possible leakage through or over the surface of the insulating material is around the periphery thereof. On the other hand, the necessary electrical clearance between the respective pairs of rotating contact members is provided by spacing the same axially on the rotor. Furthermore, the potential of the contact members, with respect to the grounded terminal, increases in the successive phases from left to right in Fig. 1, and the length of insulating material between said contact members and the grounded terminal also increases, so that a maximum length of insulation is provided for the phase which is at highest tension (namely, the right-hand phase in Fig. 1) and for the high tension terminal of the rotor, without increasing the diameter of the rotor. Another advantage of the cylindrical rotor is that it reduces wind resistance to a minimum and also serves as a convenient means for retaining the connecting strips 66, etc., which extend inside the cylinder, so that these strips may be made relatively light without risk of breaking or becoming deformed under the action of centrifugal force or wind resistance.

If desired the rotating contact means may be embedded within the insulating material of which the rotor is made, by moulding said rotor around said contact means as inserts, in well-known manner. Also, if desired, particularly when the latter type of construction is used, the rotor may be formed as a solid cylinder instead of tubular.

It is not essential that the fixed contacts, such as 11a and 11a', extend through exactly 90° each, nor that the rotating contacts, such as 24 and 24', subtend exactly 90°, as either of these parts may be made of somewhat smaller or somewhat greater angular extent, but it is desirable, in any case, that the angular extent of these two cooperating sets of contact members be such that each rotating contact shall maintain conductive relation with each fixed contact throughout approximately one-half revolution, or during one-half cycle.

If desired, the angular extent of each rotating contact member may be somewhat less than the angular distance between the fixed contact members of the corresponding phase, so that shifting of the electrical connection of any rotating contact member from one side to the other of the corresponding phase winding is positively delayed until an arc or spark of a certain predetermined length has been drawn out between the trailing end of said rotating contact member and the fixed contact member with which it has been in electrical connection. For example, in Fig. 11, the fixed contact shoes 11a and 11a' are shown substantially the same as before and the angular extent $a_1$ of each of said contact shoes is approximately 90°, but the angular extent $a_2$ of each of the rotating contact members 124 and 124' is shown as somewhat less than 90°, for example, approximately 75°. Said rotating contact members are shown as mounted upon an insulating rotor 23. The two projecting pins 27' of each contact member are connected as before by means of connecting members 28', and the remainder of the construction may also be substantially the same as above described.

Figure 11:
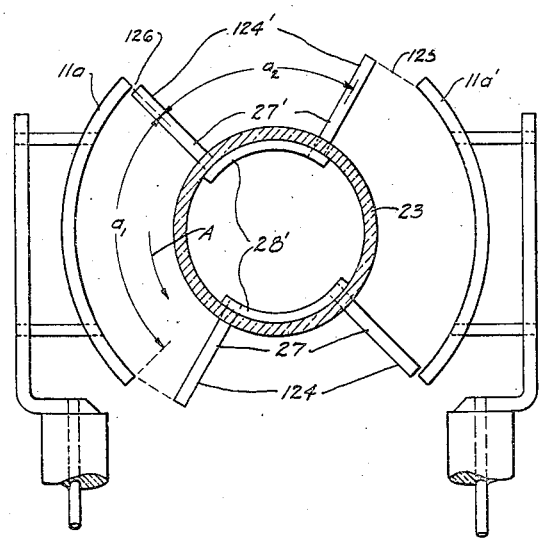
Fig. 11 is a transverse sectional view of the commutator, showing another possible modification of the rotating contact members.

In the operation of this form of the invention, assuming the direction of rotation to be as indicated by the arrow, it will be seen that the trailing end of each rotating contact member is caused to pass somewhat beyond the end of the fixed contact shoe with which it has been in electrical connection, and draw out an arc of a certain predetermined length, as indicated at 125, before the leading end of said rotating contact member comes into position opposite the other fixed contact shoe, as indicated at 126. As the air or gas between the trailing end of the rotating contact member and the fixed contact shoe with which it has been in electrical connection is in an ionized and relatively conductive condition, while the air or gas between the leading end of the rotating contact member and the other fixed contact shoe is in a substantially non-ionized and relatively non-conductive condition, it is evident that the connection will not be shifted from one to the other until a position substantially as shown in Fig. 11 is reached. At this time, or shortly thereafter, a new spark connection will be established at 126 and the arc at 125 will be extinguished, and commutation will be effected as before. However, due to the fact that a certain minimum length of the arc gap at 125 is insured, at the time the connection is broken at this point, the conductivity of this path will be equickly diminished, and as this takes place substantially at the time when the induced voltage in the corresponding phase is passing through zero in reversing from one direction to the other, it will be evident that short circuiting of that phase winding is substantially eliminated, for by the time the induced voltage again reaches an appreciable value, the conductivity across the relatively long path at 125 will be so decreased as to substantially prevent flow of current across said path. A further advantage of this particular construction is that the angular distance between the adjacent ends of the two rotating contact members is increased somewhat, and the possibility of electrical leakage therebetween is hence reduced.

When the apparatus last described is used, the relative angular positions of the fixed and rotating contact members are preferably so adjusted that commutation as above described does not occur until after the leading end of each rotating contact member has substantially reached or passed somewhat beyond the leading end of the next corresponding fixed contact member, thus insuring, as before, that the maximum voltage at which the new spark is formed and the old one broken can not exceed the voltage required to break down the resistance of the relatively short air gap between the tip of the rotating contact to the inner face of the fixed contact.

I claim:

1. An apparatus for producing unidirectional current at high voltage comprising a polyphase high voltage transformer, a rotatably mounted cylinder of insulating material, a plurality of sets of rotating contact members mounted on said cylinder and projecting outwardly therefrom, each of said sets comprising two diametrically opposed contact members and the respective sets of contact members being disposed in planes substantially perpendicular to the axis of said cylinder and spaced apart axially thereof, means for rotating said cylinder, a plurality of sets of fixed contact members corresponding to the respective sets of rotating contact members, each set of fixed contact members comprising two diametrically opposed contact members disposed in position to make spark contact with the corresponding rotating contact members upon rotation of said cylinder, means electrically connecting the fixed contact members of the respective sets to the opposite terminals of the respective phase windings of said transformer, low tension terminal means and high tension terminal means adjacent the respective ends of said cylinder and each connected to one of the rotating contact members of the sets adjacent said respective ends, and conductor means extending within said cylinder and electrically connecting the respective rotating contact members of each set intermediate said last-named sets to a rotating contact member of each adjacent set.

2. In an apparatus for producing unidirectional current at high voltage, a commutating mechanism comprising a rotatably mounted cylinder of insulating material, a plurality of sets of rotating contact members mounted on said cylinder and projecting outwardly therefrom, the respective sets of contact members being disposed in planes substantially perpendicular to the axis of said cylinder and spaced apart axially thereof, each of said sets comprising two diametrically opposed contact members each subtending an angle of approximately 90°, conductor means extending within said cylinder and establishing electrical connection between adjacent sets of contact members, means for rotating said cylinder, and a plurality of sets of fixed contact members corresponding to the respective sets of rotating contact members, each set of fixed contact members comprising two diametrically opposed contact members each subtending an angle of approximately 90°, the respective sets of fixed contact members being disposed in position to make spark contact with the corresponding set of rotating contact members upon rotation of said cylinder.

3. In an apparatus for producing unidirectional current at high voltage, a commutating mechanism comprising a rotatably mounted cylinder of insulating material, a plurality of sets of rotating contact members mounted on said cylinder and projecting outwardly therefrom, each of said sets comprising two diametrically opposed contact members and the respective sets of contact members being disposed in planes substantially perpendicular to the axis of said cylinder and spaced apart axially thereof, conductor means extending within said cylinder and establishing electrical connection between adjacent sets of contact members, means for rotating said cylinder, and a plurality of sets of fixed contact members corresponding to the respective sets of rotating contact members, each set of fixed contact members comprising two diametrically opposed contact members disposed in position to make spark contact with the corresponding rotating contact members upon rotation of said cylinder, the angular extent of each of said rotating contact members being somewhat less than the angular distance between the fixed contact members of the corresponding set so as to draw out an arc between the trailing end of each rotating contact member and the fixed contact member with which it has been in electrical connection before the leading end of said rotating contact member comes into position to make electrical connection with the other fixed contact member of the same set.

4. In an apparatus for producing unidirectional current at high voltage, a commutating mechanism comprising a rotatably mounted cylinder of insulating material, a plurality of sets of rotating contact members mounted on said cylinder and projecting outwardly therefrom, the respective sets of contact members being disposed in planes substantially perpendicular to the axis of said cylinder and spaced apart axially thereof, each of said sets comprising two diametrically opposed contact members each comprising two angularly spaced elements projecting radially from said cylinder and conductor means electrically connecting said projecting elements and disposed within and supported by said cylinder, conductor means extending within said cylinder and establishing connection between adjacent sets of contact members, means for rotating said cylinder, and a plurality of sets of fixed contact members corresponding to the respective sets of rotating contact members, each set of fixed contact members comprising two diametrically opposed contact arcuate shoes disposed in position to make spark contact with the projecting elements of the corresponding rotating contact members upon rotation of said cylinder.

5. An apparatus as set forth in claim 4, the two projecting elements of each of said rotating contact members being spaced approximately 90° from one another and each of said arcuate shoes extending through an angle of approximately 90°.

6. An apparatus as set forth in claim 4, the angular distance between the two projecting elements of each rotating contact member being somewhat less than the angular extent of each of the arcuate shoes of the corresponding set so as to draw out an arc between the trailing element of each rotating contact member and the arcuate shoe with which it has been in electrical connection before the leading element of said rotating contact member comes into position to make electrical connection with the other arcuate shoe of the same set.

7. An apparatus as set forth in claim 4, each of said projecting elements of the rotating contact members being independently adjustable radially of said cylinder.

8. An apparatus for producing unidirectional electric current at high voltage comprising a polyphase transformer and a mechanical rectifying apparatus associated therewith, said rectifying apparatus comprising a rotatably mounted hollow cylinder of insulating material, a plurality of sets of rotating contact members mounted on said cylinder and extending through the wall thereof and projecting outwardly therefrom, each of said sets comprising two diametrically opposed contact members and the respective sets of contact members being disposed in planes substantially perpendicular to the axis of said cylinder and spaced apart axially thereof, conductor means extending within said cylinder and establishing electrical connection between one of the contact members of each set and a contact member of an adjacent set, means for rotating said cylinder, a plurality of sets of fixed contact members corresponding to the respective sets of rotating contact members, each set of fixed contact members comprising two diametrically opposed contact members disposed in position to make spark contact with the corresponding rotating contact members upon rotation of said cylinder, and means electrically connecting the two fixed contact members of each set to the opposite terminals of the respective secondary phase windings of said transformer.

9. In an apparatus for producing unidirectional electric current at high voltage, a commutating mechanism comprising an axially elongated rotatably mounted insulating support, a plurality of sets of rotating contact members mounted on said insulating support and projecting outwardly therefrom, each of said sets comprising two diametrically opposed contact members each subtending an angle of approximately 90° and the respective sets of contact members being disposed in planes substantially perpendicular to the axis of rotation of said insulating support and spaced apart along said axis, conductor means mounted on said insulating support and establishing electrical connection between one of the contact members of each set and a contact member of an adjacent set, means for rotating said insulating support, and a plurality of sets of fixed contact members corresponding to the respective sets of rotating contact members, each set of fixed contact members comprising two diametrically opposed contact members each subtending an angle of approximately 90° and disposed in position to make spark contact with the corresponding rotating contact members upon rotation of said insulating support.

10. In an apparatus for producing unidirectional electric current at high voltage, a commutating mechanism comprising a rotatably mounted cylinder of insulating material, a plurality of sets of rotating contact members mounted on said cylinder and projecting outwardly therefrom, each of said sets comprising two diametrically opposed contact members and the respective sets of contact members being disposed in planes substantially perpendicular to the axis of said cylinder and spaced apart axially thereof, conductor means supported on said cylinder and establishing electrical connection between one of the contact members of each set, and a contact member of an adjacent set, means for rotating said cylinder, and a plurality of sets of fixed contact members corresponding to the respective sets of rotating contact members, each set of fixed contact members comprising two diametrically opposed contact members disposed in position to make spark contact with the corresponding rotating contact members upon rotation of said cylinder, each of said fixed contact members subtending an angle of approximately 90°, and the angular extent of each of said rotating contact members being somewhat less than the angular distance between the respective fixed contact members.

11. In an apparatus for producing unidirectional electric current at high voltage, a commutating mechanism comprising a rotatably mounted hollow cylinder of insulating material, a plurality of sets of rotating contact members mounted on said cylinder and disposed in planes substantially perpendicular to the axis of said cylinder and spaced apart axially thereof, each of said sets of contact members comprising two diametrically opposed contact members and each of said contact members comprising two angularly spaced elements extending through said cylinder and projecting radially therefrom and conducting means electrically connecting said two elements and disposed within and supported by said cylinder, conductor means extending within said cylinder and establishing electrical connection between one of the contact members of each set and a contact member of an adjacent set, means for rotating said cylinder, and a plurality of sets of fixed contact members corresponding to the respective sets of rotating contact members, each set of fixed contact members comprising two diametrically opposed contact members disposed in position to make spark contact with the projecting elements of the corresponding rotating contact members upon rotation of said cylinder.

MARCEL A. LISSMAN.